Feb. 26, 1935.  F. R. HIGLEY  1,992,210
ELECTROMECHANICAL DRIVE
Filed May 5, 1933
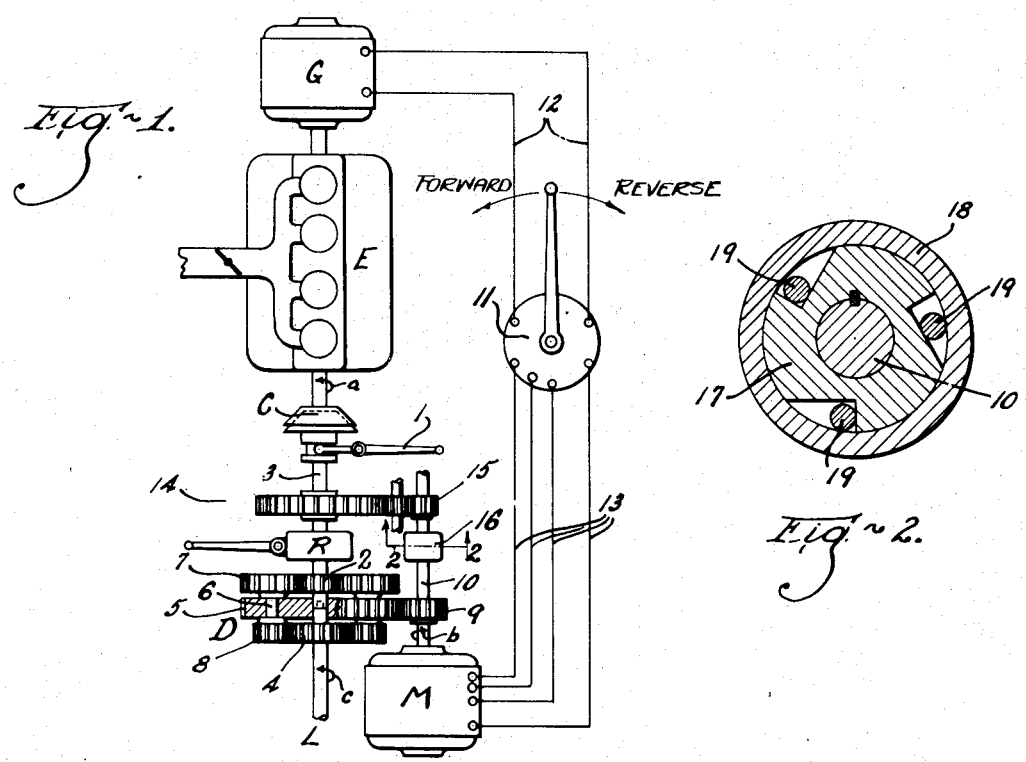
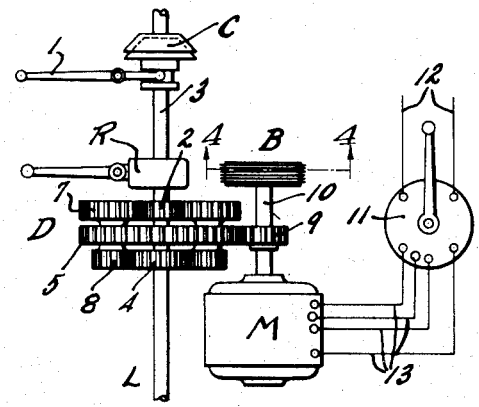
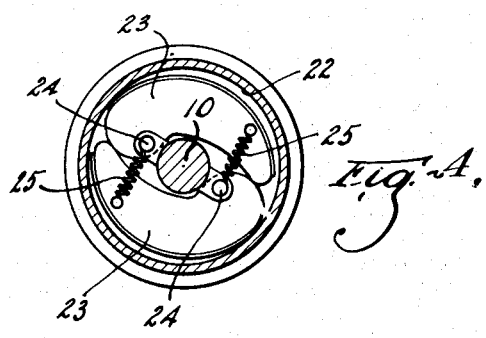
INVENTOR
FRANK R. HIGLEY
BY
Burkett, Hyde, Higley + Meyer
ATTORNEYS.

Patented Feb. 26, 1935

1,992,210

UNITED STATES PATENT OFFICE 1,992,210

ELECTROMECHANICAL DRIVE

Frank R. Higley, Cleveland Heights, Ohio

Application May 5, 1933, Serial No. 669,497

14 Claims. (Cl. 172—239)

This invention relates to electro-mechanical drives wherein a load is to be driven partly mechanically as from an engine and partly electrically, as from a motor, which motor may have its drive from a generator in turn driven by the engine, said mechanical and electrical forces being applied to the load through a differential. In such an arrangement the application of the mechanical drive to the differential and therethrough to the load is controlled by a clutch, and the application of the electric drive—which of course includes mechanical elements although for convenience here classified as electrical—is controlled by controlling the motor output.

Drives of the class described are particularly adapted for vehicles, and are specifically illustrated and described in my copending application, Serial No. 650,959, filed January 10, 1933, and in my copending applications, Serial Nos. 669,495 and 669,496, and filed of even date herewith. This invention is also particularly adapted to vehicles, and in that sense, therefore, comprises improvements over the inventions of said applications, as it could be easily applied by one skilled in the art to the constructions there shown.

The object of this invention is to provide that under certain conditions the load may be driven wholly mechanically at the will of the operator, so that if desired or necessary the entire output of the engine may be transmitted mechanically and thus positively to the load. Thus, as in accelerating a load from standstill, the load may be brought to a first and low speed wholly mechanically, by engagement of the clutch, and thereafter the load may be accelerated, electrically, by operation of the motor.

A further object of invention is to provide that the low speed, wholly mechanical drive, shall be lower in the load speed range, than has heretofore been possible. The invention also includes providing that such low speed mechanical drive shall automatically follow engagement of the clutch.

Still another object of the invention is to arrange that the motor be available for braking effect upon the load.

The exact nature of this invention together with further objects and advantages thereof will be apparent from the following description taken in connection with the accompanying drawing, in which Fig. 1 is a diagrammatic view illustrating the functional relation of the principal propelling parts of an embodiment of the invention, said parts being conventionally shown, the view being in the nature of a layout plan view; Fig. 2 is an enlarged sectional detail of the overrunning clutch employed, taken as on the line 2—2, Fig. 1; Fig. 3 is a view following the schematic showing of Fig. 1 but illustrating a modification; and Fig. 4 is a sectional detail taken as in the plane of line 4—4, Fig. 3.

With reference now to Figs. 1 and 2 of the drawings, E is a prime mover here indicated as an internal combustion engine, arranged to run in the direction indicated by the arrow $a$, and preferably arranged for operation at constant speed under governor control. L is the shaft which is in driving relation with the load to be driven from the engine E.

A mechanical connection is had from the engine to the load through a clutch C controlled by the lever 1, a reverse gear R controlled by a lever, a differential D, and the associated shafts indicated. The differential D may be of any of the several known types. It is here shown as of spur geared epicyclic type. It has a pair of input elements, one shown as the pinion 2 secured upon the shaft 3 which leads from the clutch C. It has an output element such as the gear 4 secured upon the load shaft L. The differential has a member 5 in which bear, for free rotation therein, one or more stub shafts 6. Upon each stub shaft 6 is secured a gear 7 meshing with the pinion 2, and a pinion 8 meshing with the gear 4.

It will be apparent that the member 5 comprises the second input element of the differential D, and that by the arrangement described the load shaft L will be driven differentially from the members 2 and 5.

A motor M is arranged to drive the second differential input element 5 as by a pinion 9 secured upon the motor shaft 10 and meshing with gear teeth upon the member 5. For drive of the motor M, a generator G is arranged to be driven by the engine E and a controller 11 is arranged in a generator-motor circuit including the lines 12 leading from the generator to the controller and the lines 13 leading from the controller to the motor. The motor M is a reversing motor, and the controller 11 and its circuit are arranged to provide motor operation in either direction.

What has thus far been described is not new in the art, the arrangement being one wherein the load shaft L is driven by the engine E partly by way of the clutch C and differential D, and partly from the engine by way of the generator and motor. The parts are preferably so proportioned and arranged that more of the power delivered by the engine is always transmitted by way of the clutch C than by way of the motor M, although it will be understood that the power delivered by the motor M is variable by adjustment of its controller 11.

According to this invention I provide means for limiting the speed of the motor M in the direction opposite that in which it delivers torque for ahead drive of the load shaft L, as indicated by the arrow c. More particularly I provide that the reverse speed of the motor M when the latter is driven by the differential, through the normally motor-driven input element 5 of the latter, shall be limited, as here shown, dependent upon the speed of the other engine-driven differential input element 2.

To this end I provide a connection between the motor shaft 10 and the differential driving shaft 3. This connection as here shown, includes a gear 14 secured on the shaft 3, a pinion 15 associated with the motor M, and an idler pinion between the gear 14 and pinion 15. The connection also includes an overrunning clutch generally indicated at 16 and so arranged that the speed of the motor M is unlimited in the direction of the arrow b, in which direction the motor delivers torque, but in the other direction cannot exceed that ratio to the speed of the shaft 3 determined by the gears 14 and 15. The details of the clutch are not material but as indicated Fig. 2 the clutch may include inner and outer elements 17 and 18 cooperative through the medium of rollers 19 to interengage by jamming of the rollers, the element 17 being secured upon the motor shaft 10, and the element 18 being secured with the shaft of the pinion 15. The essential things are that the overrunning clutch be located to be effective between the motor-driven and the engine-driven input elements of the differential D, and be arranged correctly as to free-running and engaging directions.

Operation will be as follows, assuming the engine E running at constant speed in the direction indicated by the arrow a, the clutch C disengaged, the reverse gear R set for ahead drive, to move the load in the direction of the arrow c, and the controller 11 in neutral position.

To start the load the operator engages the clutch C, causing corresponding rotation of the engine-driven input element 2 of the differential D. Because of the magnitude of the load, and the consequent resistance to drive of the load shaft L, the motor M will be driven or idled mechanically in reverse direction, opposite that indicated by the arrow b, by the other differential input element 5. Upon this reverse or idling operation of the motor M, the overrunning clutch 16 automatically engages, limiting the motor speed to that provided by the gears 14 and 15.

Since this limits the speed of the input element 5 of the differential, because of the intermeshing of gears 5 and 9, the load shaft L is caused to move, at a low speed compared with that of the engine, but positively. This speed is less than the speed at which the load would be driven were the differential input element 5 secured stationary, and is obviously determined by the ratio provided by the gears 14 and 15. It is lowered as the size of the gear 14 is greater than that of its pinion 15.

The drive from the engine to the load is now wholly mechanical by way of the clutch C, reverse gear R, differential input element 2 and differential output element 4, the speed of the latter being determined by the speed of the other differential input element 5, which in turn is determined by the speed permitted by the gears 14 and 15—in other words, by the speed of the differential input element 2.

To speed up the load the operator advances the motor controller 11 to cause the motor M to deliver torque in the direction of the arrow b. Since the motor was previously being idled in the opposite direction it first slows down, passes through zero speed and eventually runs ahead in the direction of the arrow b, the clutch 16 freely permitting the motor to thus overrun the pinion 15. As the motor speed changes from maximum in idling direction to maximum in ahead direction, the differential input element 5 correspondingly changes its direction of travel, always delivering its torque in the same direction, however, and its speed being superimposed upon that of the other input element 2, the speed of the load shaft L is increased to maximum in the direction of the arrow c. The load is now being driven at full speed ahead. Preferably the parts are so proportioned and arranged as to capacity of the electrical system compared with that of the engine, and as to gear ratios provided in the differential D, that at such full speed ahead the differential gears have approximately zero pitch speed, all revolving about the common axis at the same speed.

Should the load tend to overrun the engine by adjustment of the controller 11 the motor M may be caused to deliver torque in the opposite direction, acting as a brake to limit the speed of the load; the motor speed, of course, being maintained by the operator below the maximum permitted by the clutch 16, if the electrical braking be during forward running of the vehicle.

To stop the load the described starting operations are performed in the reverse order.

To start the load in reverse direction, the starting operations are generally as before except that the reverse gear is shifted into reverse before engagement of the clutch C, and the motor controller is thereafter similarly shifted in its reverse direction. In the operation of the load in reverse direction the overrunning clutch 16 is without effect except that it would limit the maximum speed of the motor in the direction in which it then was delivering torque.

With reference now to the modification of Figs. 3 and 4, the arrangement is generally as in Fig. 1 except as hereinafter noted, the electric control arrangement for the motor M being as in Fig. 1. On the motor shaft 10, however, there is provided a brake B arranged for automatic speed-responsive application. As indicated, Fig. 4, the brake includes a fixed brake member 22 secured against rotation in any convenient manner. On the shaft 10 are mounted a plurality of brake shoes 23, two being indicated, cooperative with the brake drum 22. Each brake shoe 23 is secured with the shaft 10 as at 24 to be swung by centrifugal force into engagement with the brake drum 22. But such swinging motion is opposed by a spring 25. The arrangement is such that the shaft 10 may freely operate up to a certain pre-determined speed regardless of direction, whereupon the shoes 23 will be applied to the drum 22 with effect to prevent the shaft 10 from exceeding such speed. The parts are so proportioned and arranged that the speed permitted the shaft 10 is relatively great—in the reverse or idling direction sufficient to cause operation of the load shaft L at a very low speed, and in the ahead direction sufficient to limit the motor M to a safe speed.

Operation will be apparent. The load is started as in the arrangement of Fig. 1 by engagement of the clutch C after adjustment of the reverse gear R for the proper direction of drive and of the controller 11 to neutral position. Engagement of the clutch is followed by idling reverse operation of the motor M which in turn, however, is limited automatically as the brake B engages. As the brake B engages, the load shaft L is caused to operate at low speed. Thereafter the motor controller is adjusted in the direction corresponding to the setting of the reverse gear to cause the motor M to deliver torque in the direction to advance the speed of the load shaft L, the motor first, however, slowing down, passing through zero, and thereafter moving ahead. Such ahead speed of the motor is limited automatically by the brake B which automatically releases as the motor is slowed down by setting of its controller, and thereafter will automatically re-engage should the motor speed become excessive in the ahead direction. Should the load tend to overrun the engine it is obvious that the brake B will automatically engage to prevent excessive motor speed.

What I claim is:

1. In combination with an engine, a generator driven thereby, a motor connected to be energized from the generator, differential means having a load-driving output element and a pair of input elements arranged for differential drive thereof, means for driving one of said input elements from said engine, a driving connection from said motor to the other of said input elements, and means effective between said motor and said engine-driven input element to permit reverse drive of said motor by its input element at a reverse speed positively dependent upon the speed of the engine-driven input element.

2. In combination with an engine, a generator driven thereby, a motor connected to be energized from the generator, differential means having a load-driving output element and a pair of input elements arranged for differential drive thereof, means for driving one of said input elements from said engine, a driving connection from said motor to the other of said input elements, and means independent of said motor-generator connection and effective between said motor and said engine-driven input element to permit reverse drive of said motor by its input element at a reverse speed dependent upon the speed of the engine-driven input element, but leaving said motor free for ahead operation.

3. In combination with an engine, a generator driven thereby, a motor connected to be energized from the generator, differential means having a load-driving output element and a pair of input elements arranged for differential drive thereof, means for driving one of said input elements from said engine, a driving connection from said motor to the other of said input elements, and gearing effective between said motor and said engine-driven input element to permit reverse drive of said motor by its input element at a reverse speed dependent upon the speed of the engine-driven input element, but leaving said motor free for ahead operation.

4. In combination with an engine, a generator driven thereby, a motor connected to be energized from the generator, differential means having a load-driving output element and a pair of input elements arranged for differential drive thereof, means for driving one of said input elements from said engine, a driving connection from said motor to the other of said input elements, and means independent of the output of said generator effective between said motor and said engine-driven input element to permit reverse drive of said motor by its input element at a substantial but limited reverse speed.

5. In combination with an engine, a generator driven thereby, a motor connected to be energized from the generator, differential means having a load-driving output element and a pair of input elements arranged for differential drive thereof, means for driving one of said input elements from said engine, a driving connection from said motor to the other of said input elements, and gearing effective between said motor and said engine-driven input element to permit reverse drive of said motor by its input element at a substantial but limited reverse speed.

6. In combination with an engine, a generator driven thereby, a motor connected to be energized from the generator, differential means having a load-driving output element and a pair of input elements arranged for differential drive thereof, means for driving one of said input elements from said engine, a driving connection from said motor to the other of said input elements, and means independent of said motor-generator connection and effective between said motor and said engine-driven input element to permit reverse drive of said motor by its input element at a substantial reverse speed but dependent upon the speed of the engine-driven input element.

7. In combination with an engine, a generator driven thereby, a motor connected to be energized from the generator, differential means having a load-driving output element and a pair of input elements arranged for differential drive thereof, means for driving one of said input elements from said engine, a driving connection from said motor to the other of said input elements, and means associating said motor with said engine-driven input element to permit reverse drive of said motor by its input element at a reverse speed dependent upon the speed of the engine-driven input element, said associating means including one-way clutch means permitting said motor freedom to run in ahead direction.

8. In combination with an engine, a generator driven thereby, a motor connected to be energized from the generator, differential means having a load-driving output element and a pair of input elements arranged for differential drive thereof, means for driving one of said input elements from said engine and including an operator-controlled clutch, a driving connection from said motor to the other of said input elements, and means effective between said motor and said engine-driven input element to permit reverse drive of said motor by its input element at a substantial reverse speed dependent upon the speed of the engine-driven input element, whereby engagement of said clutch will be followed by positive mechanical drive of said output element at a low speed.

9. In combination with an engine, a generator driven thereby, a motor connected to be energized from the generator, a controller for said motor energizing connection, differential means having a load-driving output element and a pair of input elements arranged for differential drive thereof, means for driving one of said input elements from said engine and including an operator-controlled clutch, a driving connection from said motor to the other of said input elements, and means effective between said motor and said engine-driven input element to permit reverse drive of said motor by its input element at a reverse speed dependent upon the speed of the engine-driven input element, but without affecting ahead speed of said motor, whereby engagement of said clutch will be followed by positive mechanical drive of said output element at a low speed, and thereafter said low speed may be increased by adjustment of said controller.

10. In combination with an engine, a generator driven thereby, a motor connected to be energized from the generator, a controller for said motor energizing connection, differential means having a load-driving output element and a pair of input elements arranged for differential drive thereof, means for driving one of said input elements from said engine and including an operator-controlled clutch, a driving connection from said motor to the other of said input elements, and means associating said motor with said engine-driven input element to permit reverse drive of said motor by its input element at a reverse speed dependent upon the speed of the engine-driven input element, said associating means including a one-way clutch arranged to permit said motor freedom to run in ahead direction dependent upon the setting of its said controller.

11. In combination with an engine, a generator driven thereby, a reversing motor connected to be energized from the generator, a reversing controller for said motor energizing connection, differential means having a load-driving output element and a pair of input elements arranged for differential drive thereof, means for driving one of said input elements from said engine and including an operator-controlled clutch, a driving connection from said motor to the other of said input elements, and means associating said motor with said engine-driven input element to permit reverse drive of said motor by its input element at a substantial reverse speed dependent upon the speed of the engine-driven input element, but leaving said motor free for ahead operation, whereby engagement of said clutch will be followed by positive mechanical drive of said load at low speed accompanied by reverse drive of said motor at substantial speed, and thereafter acceleration of said load may be effected by setting of said controller in ahead direction, and braking of said load may be effected by a reverse setting of said controller.

12. In combination with an engine, a motor and means for driving the same, differential means having a load-driving output element and a pair of input elements arranged for differential drive thereof, means for driving one of said input elements from said engine, a driving connection from said motor to the other of said input elements, and means effective upon said motor-driven input element to permit it to drive said motor at a limited reverse speed independent of motor energization.

13. In combination with an engine, a motor and means for driving the same, differential means having a load-driving output element and a pair of input elements arranged for differential drive thereof, means for driving one of said input elements from said engine, a driving connection from said motor to the other of said input elements, and speed-responsive brake means effective upon said motor-driven input element dependent upon the speed of the latter.

14. In combination with an engine, a motor and means for driving the same, differential means having a load-driving output element and a pair of input elements arranged for differential drive thereof, means for driving one of said input elements from said engine, a driving connection from said motor to the other of said input elements, and means effective upon said motor-driven input element to permit it to drive said motor at a reverse speed positively limited with respect to said engine-driven input element.

FRANK R. HIGLEY.